D. U. BILLINGS.
SLIDE PRESENTING MACHINE.
APPLICATION FILED AUG. 30, 1916.

1,226,177.

Patented May 15, 1917.
4 SHEETS—SHEET 1.

Witnesses

D. U. Billings,
Inventor by
Attorneys

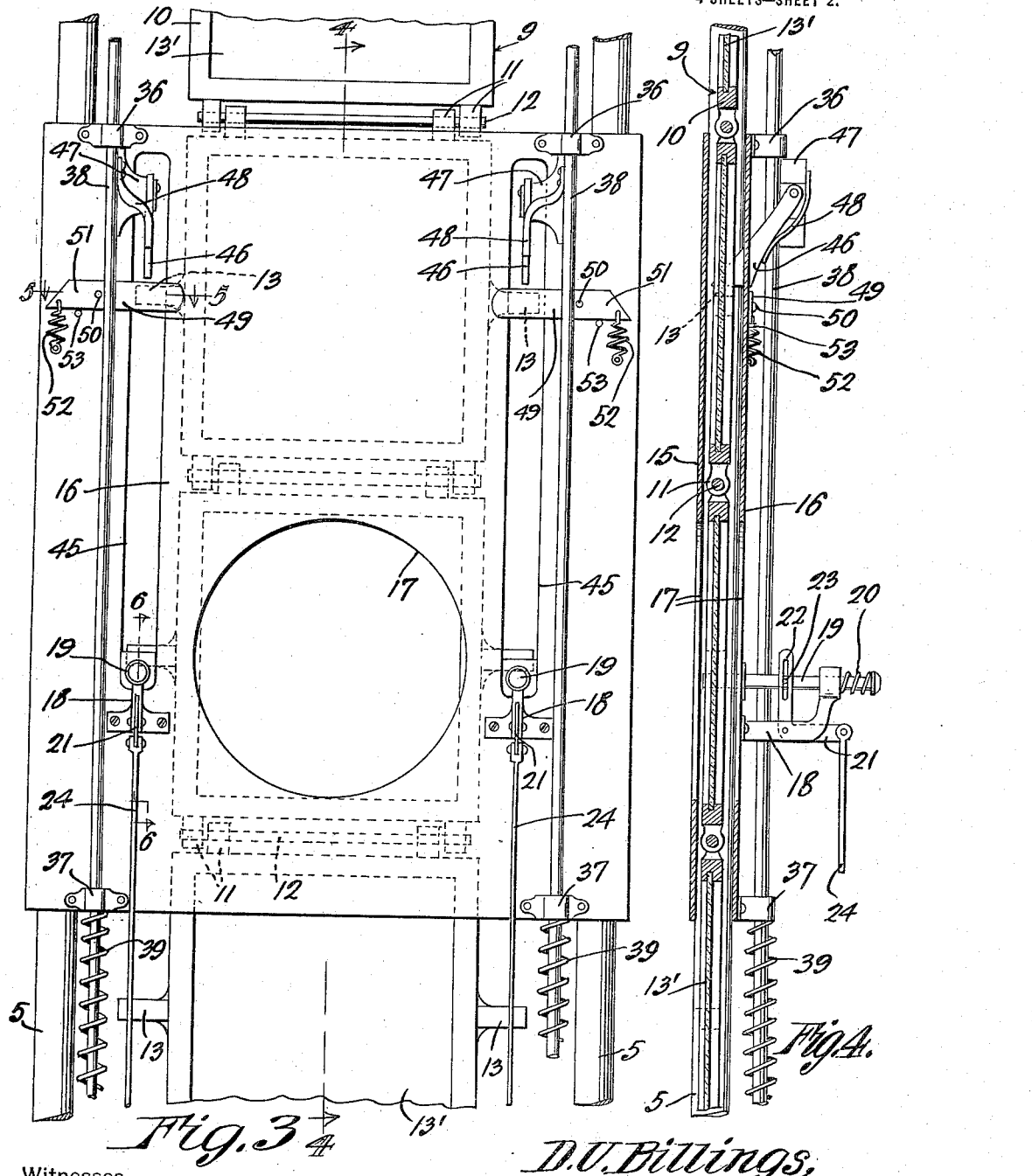

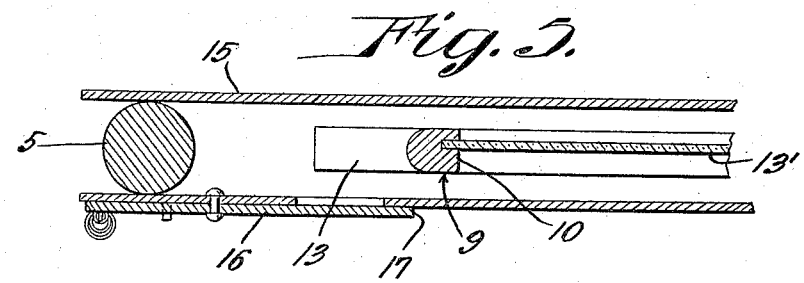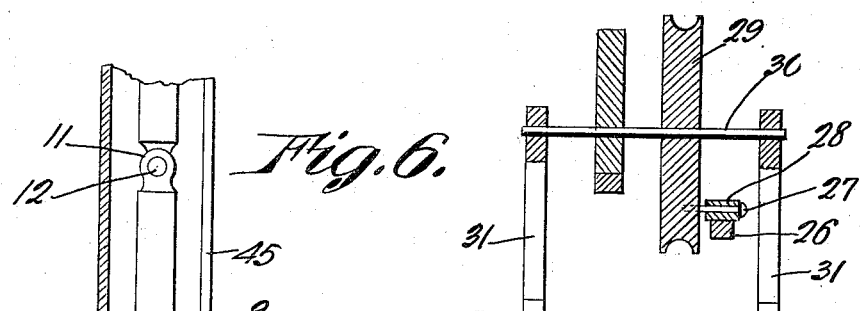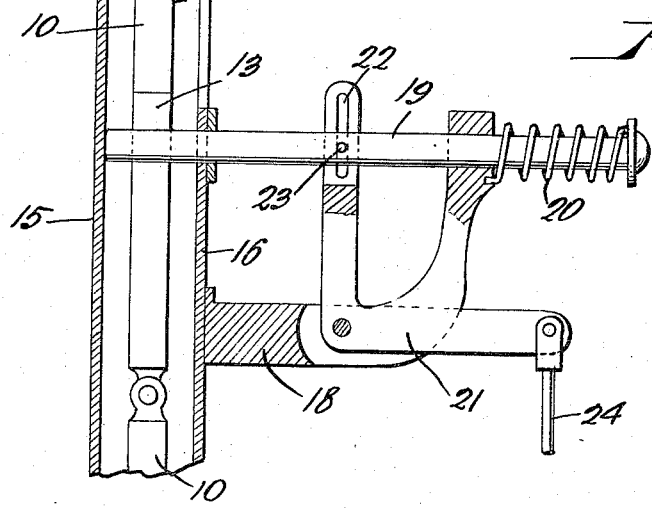

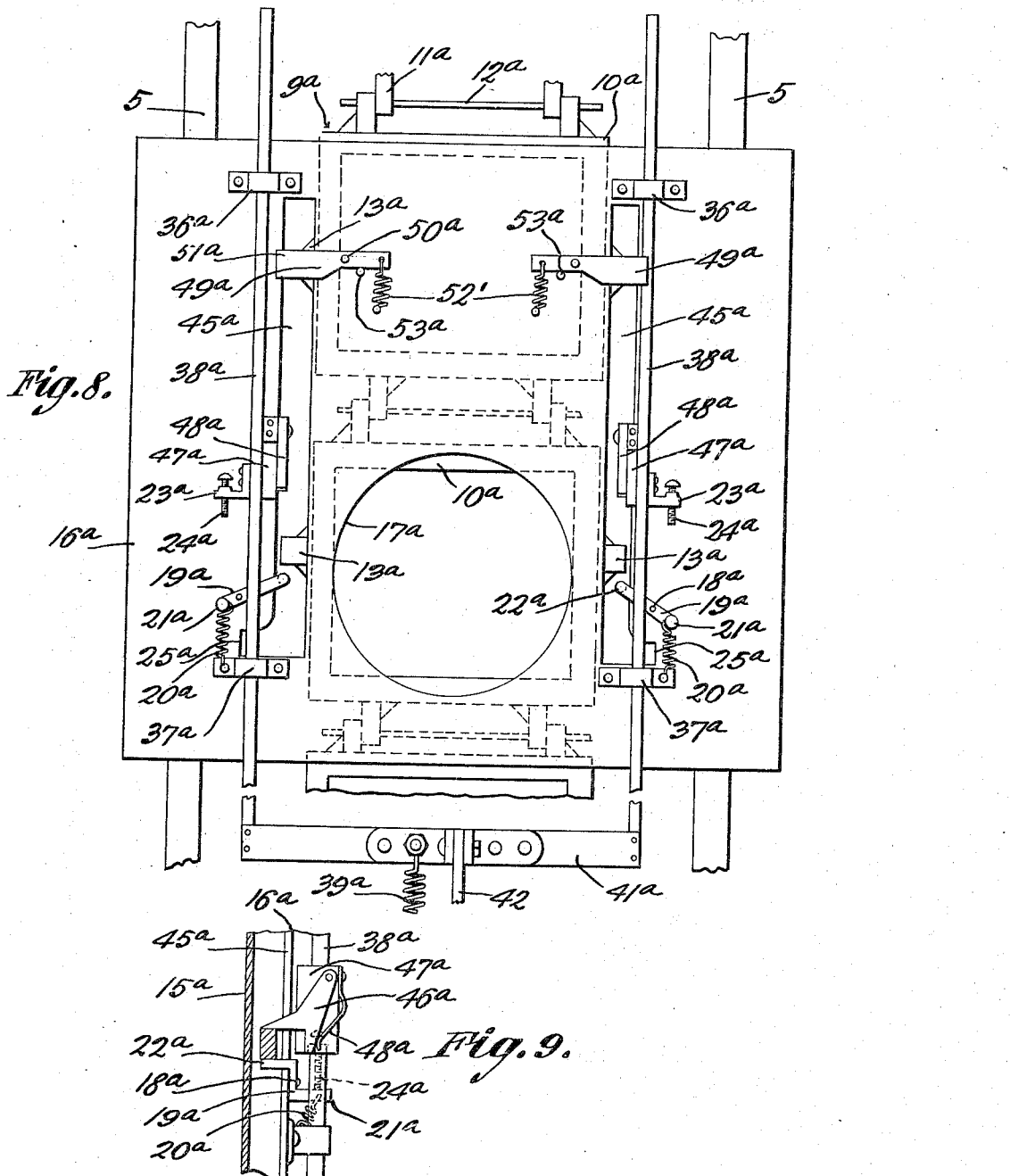

UNITED STATES PATENT OFFICE.

DONALD UNDERWOOD BILLINGS, OF TOPEKA, KANSAS.

SLIDE-PRESENTING MACHINE.

1,226,177.   Specification of Letters Patent.   Patented May 15, 1917.

Application filed August 30, 1916. Serial No. 117,740.

*To all whom it may concern:*

Be it known that I, DONALD U. BILLINGS, a citizen of the United States, residing at Topeka, in the county of Shawnee and State of Kansas, have invented a new and useful Slide-Presenting Machine, of which the following is a specification.

The present invention appertains to slide presenting machines, and aims to provide a novel and improved mechanism for presenting a series of stereopticon slides one at a time and without manual attention, the machine being automatic, and being useful in lecture halls for automatically presenting stereopticon views, in show windows and elsewhere for presenting advertising matter contained on the slides, and the like.

It is the object of the invention to provide a chain of slides mounted for circuituous movement, and novel means for moving the chain step-by-step to present the slides one at a time.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed without departing from the spirit of the invention.

The invention is illustrated in the accompanying drawings, wherein:—

Fig. 3 is an enlarged fragmental front view illustrating the details more clearly.

Fig. 4 is a vertical section taken on the line 4—4 of Fig. 3.

Fig. 5 is an enlarged horizontal section taken on the line 5—5 of Fig. 3.

Fig. 6 is an enlarged vertical section taken on the line 6—6 of Fig. 3.

Fig. 7 is an enlarged vertical section taken on the line 7—7 of Fig. 1.

Fig. 8 is a view similar to Fig. 3 illustrating certain modifications.

Fig. 9 is a sectional detail of the modified form.

Figure 1:
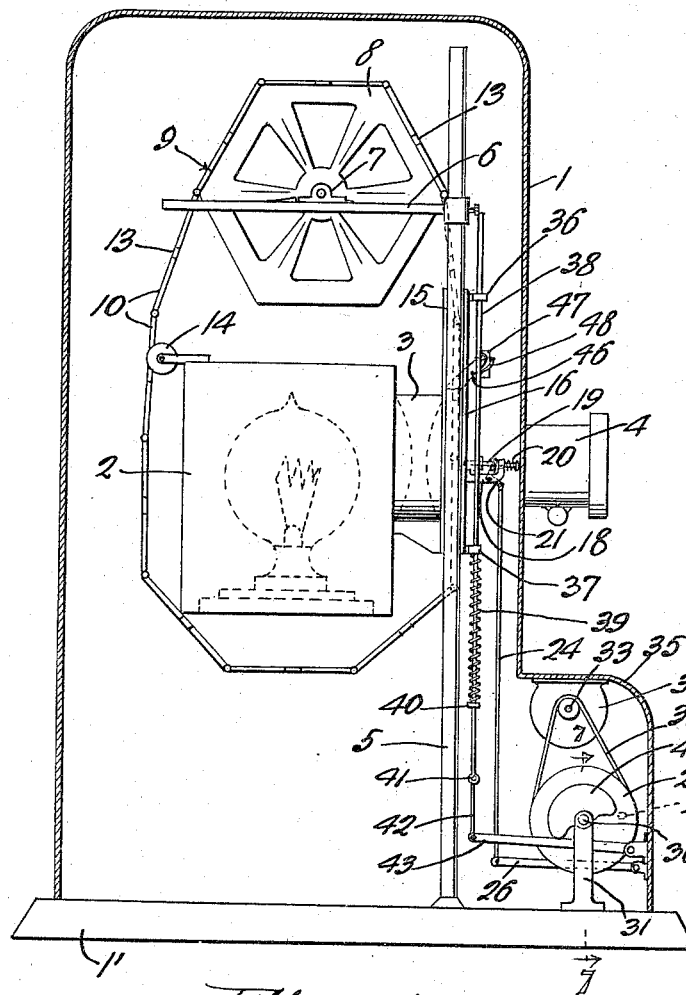
Figure 1 is a side elevation of the mechanism, the casing being shown in section.
Figure 2:
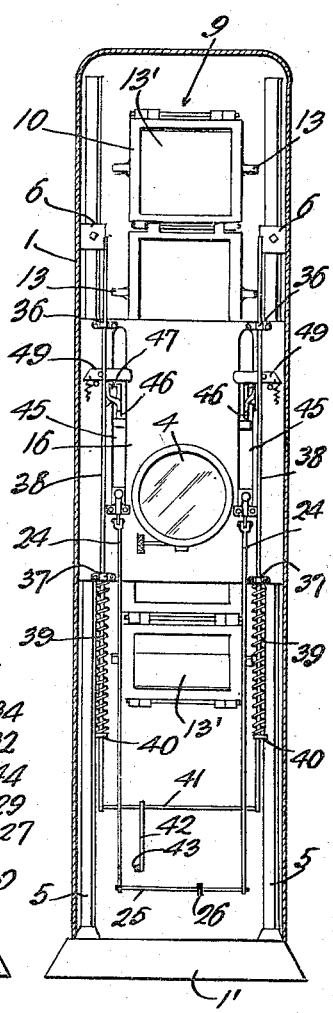
Fig. 2 is a front view of the mechanism with the casing shown in section.

In carrying out the invention, there is provided a suitable upstanding casing or housing 1 constructed of sheet metal or other suitable material, and carried by a base 1'. A lamp house 2 for a nitrogen or other suitable lamp is mounted within the casing 1 and carries a light condenser 3 in front of which the slides are brought to be illuminated. The front wall of the casing has a projecting lens 4 in front of the condenser 3 for projecting the view, advertising matter, or other matter contained upon the slide.

Carried by the base 1' immediately in rear of the front wall of the casing is a pair of standards 5 spaced apart transversely, and having adjustably secured thereon adjacent their upper ends rearwardly projecting brackets 6 carrying bearings 7. A polygonal wheel 8 is journaled to the bearings 7 between the brackets 6, and supports an endless slide chain 9, the links 10 of which are in the form of frames having the hinges butts 11 pivotally connected by the transverse hinge pins 12. Said frames or links 10 are adapted to hold in any suitable manner the stereopticon slides 13', said slides being removable in any suitable manner whereby they can be changed or replaced. The frames or links 10 have outstanding lugs 13 at their side edges to facilitate the step-by-step movement of the chain. The chain is hung from the wheel 8 in loop form, passing around the lamp house 2. The forward run of the chain is disposed between the standards 5, and the rear run of the chain is held spaced from the lamp house 2 by means of a roller 14 carried by the lamp house, thereby avoiding the rubbing of the slides against the lamp house.

Attached to the standards 5 between the condenser 3 and lens 4 is a pair of vertical plates 15—16 between which the forward run of the chain is movable, whereby to form a guide way for the chain. Said plates have openings 17 for the passage of the light rays through the slide which is brought in front of the condenser, and the plates 15—16 are opaque to cut off stray light rays.

A device is employed for limiting the further movement of the chain after it has been moved one step, until the chain is ready to be moved the next step. Said device embodies a pair of brackets 18 attached to the plate 16 and projecting forwardly therefrom, and stop or detent rods 19 are slidable in the free ends of the brackets 18 and the plates 16. The brackets 18 and rods 19 are disposed at the opposite sides of the chain or adjacent the upright edges of the plate 16, and the rear ends of the rods 19 are projectable rearwardly in the path of the lugs 13 of the chain 9, whereby to limit and stop the movement of the chain. The rods 19 are moved rearwardly to projected position by coiled wire retractile springs 20 connecting the brackets 18 and the forward ends of said rods 19, and said rods are retracted by means of bell crank levers 21 having their elbows fulcrumed to the brackets 18 and having their upwardly projecting arms provided with slots 22 receiving lugs 23 with which the rods 19 are provided. Vertical links or rods 24 have their upper ends pivotally connected with the forwardly projecting arms of the levers 21, and the lower ends of said links are connected by a cross piece 25 with which the rear free end of a lever 26 is pivotally engaged. The other end of said lever is fulcrumed in any suitable manner, and said lever is depressed intermittently by an outstanding cam pin 27 projecting from one face of a wheel 29, a roller 28 being preferably mounted upon the pin 27 to provide a rolling contact with the lever 26. The wheel 29 is mounted upon a shaft 30 carried by pedestals 31 mounted upon the base 1', and said wheel 29 or shaft 30 is connected at 32 by a suitable speed reduction gear with the pulley wheel 33 of an electric motor or other prime mover 34 so that the device will operate slowly while the motor runs at a high rate of speed. The motor 34, wheel 29 and accompanying parts are preferably disposed within a lower forwardly projecting extension 35 of the casing 1. When the cam pin 27 is moved from the lever 26, the stop rods 19 will be moved rearwardly, as seen in Fig. 6, and the bell crank levers 21 will be swung to raise the links 24 and lever 26, but when the pin 27 reaches and moves to its lowermost position, it depresses the lever 26, thus pulling the links 24 downwardly, and swinging the bell crank levers 21 to retract the stop rods 19 against the tension of their springs 20.

The motor 34 also serves to operate the device for advancing the chain step-by-step. Said device includes bearings 36 secured to the plate 16 adjacent its upper end and bearings 37 secured to said plate adjacent its lower end, a pair of vertical rods 38 being slidable through said bearings adjacent the opposite side edges of the plate 16. Said rods 38 are normally raised by means of coiled wire retractile springs 39 surrounding them and secured to the bearings 37 and collars 40 secured upon said rods, and a cross piece 41 is secured to the lower ends of said rods and is connected by a link 42 with the rear free end of a lever 43 having its other end fulcrumed in any suitable manner. A cam 44 is secured upon the shaft 30 which is rotated by the pulley wheel 29, and is so arranged, that when the lever 26 is depressed by the pin 27, the cam 44 will engage the lever 43 and start to move the same downwardly, the pin 27 being removed from the lever 26 while the cam 44 is moving the lever 43 downwardly. The plate 16 has vertical slots 45 extending upwardly from the stop rods 19 and within which pawls or dogs 46 are movable vertically with the rods 39, said pawls being pivoted to ears 47 of the rods 38 and projecting rearwardly and downwardly through the slots 45, so that the free ends of the pawls are in the paths of the lugs 13. The pawls are swung rearwardly by springs 48 carried by the ears 47, which permit the pawls to swing forwardly. When the rods 38 are moved upwardly, the pawls 46 are engageable over the lugs 13 of the frame 10 next above the frame of the slide which is in front of the condenser 3, in order that when the rods 38 are moved downwardly by the lever 43 and cam 44, the chain will be advanced one step.

In order to prevent the reverse or retrograde movement of the chain when the pawls 46 are moved upwardly, arms or deflectors 49 are pivoted, as at 50, to the plates 16 at the exterior sides of the slots 45, whereby the arms 49 project across said slots in front of the lugs 13 of the frame 10 next above the frame of the slide which is in operative position. The arms 49 have extensions 51 connected by retractile springs 52 with the plate 16, and said plate has stops 53 against which the extensions 51 normally rest, to hold the arms 49 in the position indicated. The stops 53 prevent the upward movement of the arms 49, but said arms are movable downwardly out of the way. Thus, when the pawls 46 are raised, they engage the arms 49 before reaching the respective lugs 13, and said arms 49 deflect the pawls 46 forwardly out of the way of said lugs 13, and after the pawls 46 reach their uppermost position, they are slightly above the arms 49 and spring rearwardly over the lugs. The arms 49 can swing downwardly out of the way when the pawls 46 are moved downwardly. The pawls 46 are thus deflected out of the way of the respective lugs 13 and are permitted to move over said lugs, without the liability of the chain being moved backwardly.

In operation, the power for moving the chain 9 is supplied by the motor or prime mover 34, and when a slide is in position in front of the condenser 3, the lugs 13 of the frame 10 of said slide seat upon the stop rods 19, thus avoiding the accidental or excessive movement of the chain. After the slide has remained in position for a short period of time, determined by the speed of movement of the cam pin 27 and cam 44, the cam pin 27 depresses the lever 26, thereby retracting the stop rods 19, and the cam 44 immediately moves the lever 43 downwardly. During the time that the slide is in the position stated, the rods 38 are in their uppermost position, under the influence of the springs 39, with the pawls 46 above or resting upon the lugs 13 of the next upper frame, so that when the rods 38 are moved downwardly by the lever 43, the chain will be advanced. This is permitted since the stop rods 19 are retracted, but during the downward movement of the forward run of the chain, the cam pin 27 is removed from the lever 26, thus permitting the stop rods 19 to be again projected. The interim that the rods 19 are retracted is sufficient to permit the respective lugs 13 to pass said rods, and after the rods 19 are again projected, they will stop the chain at the proper point when the lugs 13 of the frame 10 moved by the pawls 46 contact with said rods. The cam 44 is then removed from the lever 43, and the chain 9 remains at a standstill to exhibit the projected matter for a period of time. As the cam 44 leaves the lever 43, said lever and rods 38 are moved upwardly by the springs 39, thus bringing the pawls 46 into position for the next operation. As above described, the pawls 46 are moved out of the way of the respective lugs 13 by the arms or deflectors 49 to prevent the backward movement of the chain, or a vibration thereof, which might occur if the pawls 46 were allowed to ride or brush past the lugs. The operation is then repeated, and it will be observed that the series of slides are therefore presented one at a time at suitable intervals, and the chain moves through a circuitous path in order that the slides will be presented in succession as long as the machine continues to operate. The chain can be of any suitable length to contain the desired number of slides, and the frames or links 10 as well as the slides can be readily removed and replaced.

In the modified form shown in Figs. 8 and 9, the parts 9ª, 10ª, 11ª, 12ª, 13ª, 15ª, 16ª, 17ª, 36ª, 37ª, 38ª, 39ª, 41ª, 45ª, 46ª, 47ª, 48ª, 49ª, 50ª, 51ª, 52ª and 53ª are practically the same as the correspondingly numbered parts above described, some slight changes being made, such as the connection of the spring 39ª with the part 41ª for pulling the rods 38ª downwardly and the reversal of the deflectors 49ª. In this form, the parts 18, 19, 20, 21, 22, 23, 24, 25, 26, 27 and 28 are eliminated and substituted by a modified form of stopping means for the endless slide chain 9ª. Thus, stop levers 19ª are pivoted or fulcrumed, as at 18ª, to the outer surface of the plate 16ª at the exterior sides of the slots 45ª adjacent to the lower ends of said slots, and the remote arms of the levers 19ª are provided with fingers or lugs 21ª extending outwardly at an angle. Springs 20ª are connected to the fingers 21ª to pull them downwardly, whereby to yieldably raise the adjacent arms of the levers which are provided with rearwardly projecting fingers or lugs 22ª projecting through the slots 45ª. The springs 20ª normally swing the levers 19ª to bring the fingers 22ª against the exterior edges of the slots 45ª, whereby the fingers 22ª are in such positions, to support the outstanding lugs 13ª of the link or frame 10ª of the slide which is in operative position. The slide advancing rods 38ª are provided adjacent to the pawls 46ª with outstanding lugs 23ª above the exterior arms of the levers 19ª, and contact screws 24ª are threaded downwardly through the lugs 23ª to contact with the fingers 21ª.

The operation of the slide advancing means of the modified form is substantially the same as the first form above described. When the new slide is being moved downwardly by the pawls 46ª engaging the lugs 13ª of said slide, the lugs 13ª of the slide being moved downwardly from displaying position will press the fingers 22ª downwardly and will force them into the angular extensions 25ª of the lower ends of the slots 45ª, whereby said lugs 13 can pass the fingers 22ª as the new slide is being brought into position, and when the lugs 13ª have passed the levers 19ª, said levers will be swung back to normal position to stop the slide which is being moved into position, and the levers 19ª are prevented from being swung by this slide due to the fact that when the lugs 13ª are brought into engagement with the fingers 22ª, the screws 24ª which are properly adjusted, will contact with the fingers 21ª, thereby preventing the levers 19ª from being swung by the contact of the lugs 13ª therewith, and consequently, the new slide will be stopped at the proper point for display. Then, as the dogs or pawls 46ª are raised, the levers 19ª are liberated so that they can be operated when the next slide is moved into position, but the springs 20ª hold the stop levers 19ª in place to support the forward run of the chain 9ª against downward movement accidentally.

Having thus described the invention, what is claimed is:—

1. A slide presenting machine embodying an endless chain mounted for circuitous movement and comprising hingedly connected slide-carrying frames having outstanding lugs at their side edges, a pair of plates between which the chain is movable, stops carried by one plate and normally projected into the path of said lugs to stop the chain, one plate having slots, slidable rods mounted adjacent said slots, pawls pivotally connected with the rods and working in said slots to engage said lugs, and means for reciprocating said rods to intermittently advance the chain, the stops being moved out of the way when the aforesaid means is brought into operation to advance the chain.

2. A slide presenting machine embodying an endless chain mounted for circuitous movement and comprising hingedly connected slide-carrying frames having lugs, a reciprocatory member, a pawl carried by said member engageable with said lugs, and means for deflecting said pawl away from a lug when the pawl passes said lug during the return movement thereof.

3. A slide presenting machine embodying an endless chain mounted for circuitous movement and comprising hingedly connected slide-carrying frames having lugs, a reciprocatory member, a pawl carried by said member engageable with said lugs, and a deflector for deflecting the pawl away from a lug when the pawl is returned past said lug, said deflector being movable out of the way when the pawl is advanced.

4. A slide presenting machine embodying an endless chain mounted for circuitous movement and comprising hingedly connected slide-carrying frames having lugs, a plate adjacent said chain having a slot, a reciprocatory rod adjacent said plate, a pawl carried by said rod working in said slot and engageable with said lugs, and a deflector pivoted to said plate and extending across said slot to deflect the pawl away from the lug when the pawl is returned past said lug, the deflector being swingable out of the way when the pawl is advanced.

5. A slide presenting machine embodying an endless chain mounted for circuitous movement and comprising hingedly connected slide-carrying frames having outstanding lugs at their side edges, a pair of vertical plates between which the chain is movable downwardly, said plates having light openings, stops carried by one plate and normally projecting into the paths of said lugs to stop the chain, one plate having vertical slots extending upwardly from said stops, vertical reciprocatory rods carried by said plate adjacent said slots, pawls pivoted to said reciprocatory rods and projecting through said slots to engage said lugs, means for reciprocating said reciprocatory rods, the stops being moved out of the way when the reciprocatory rods are started downwardly, and deflectors carried by said plate and normally projecting across said slots to deflect the pawls away from the lugs when the pawls are moved upwardly past said lugs, said deflectors being movable downwardly out of the way.

6. A slide presenting machine embodying an endless chain mounted for circuitous movement and comprising hingedly connected slide-carrying frames having outstanding lugs, a stop member against which said lugs are movable to stop the movement of the chain, a reciprocatory member, and a pawl carried by the reciprocatory member engageable with said lugs for intermittently advancing the chain, the stop member being moved out of the way when the pawl is brought into operation for advancing the chain.

In testimony that I claim the foregoing as my own, I have hereto affixed my signature in the presence of two witnesses.

DONALD UNDERWOOD BILLINGS.

Witnesses:
J. C. MILLER,
B. A. REYNOLDS.

Copies of this patent may be obtained for five cents each, by addressing the "Commissioner of Patents, Washington, D. C."